(12) United States Patent
Duan et al.

(10) Patent No.: US 7,680,093 B2
(45) Date of Patent: Mar. 16, 2010

(54) SECTOR SELECTION FOR F-SCH

(75) Inventors: Long Duan, San Diego, CA (US); Rath Vannithamby, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1532 days.

(21) Appl. No.: 10/928,410

(22) Filed: Aug. 27, 2004

(65) Prior Publication Data

US 2006/0045061 A1    Mar. 2, 2006

(51) Int. Cl.
*H04B 7/216* (2006.01)

(52) U.S. Cl. .................. 370/342; 370/331; 370/335; 375/130; 375/147; 455/450; 455/452.2

(58) Field of Classification Search ............ 455/434, 455/436–437, 442, 522, 450–453, 423–425, 455/67.7, 67.11, 135; 370/329, 331–333, 370/335, 342; 375/147, 149
See application file for complete search history.

(56) References Cited

U.S. PATENT DOCUMENTS

| | | | | |
|---|---|---|---|---|
| 4,670,899 A | * | 6/1987 | Brody et al. | 455/453 |
| 5,586,170 A | * | 12/1996 | Lea | 455/452.1 |
| 5,850,605 A | * | 12/1998 | Souissi et al. | 455/437 |
| 6,223,041 B1 | * | 4/2001 | Egner et al. | 455/452.2 |
| 6,414,938 B1 | * | 7/2002 | Corke et al. | 370/231 |
| 6,507,572 B1 | * | 1/2003 | Kumar et al. | 370/335 |
| 6,516,196 B1 | * | 2/2003 | Chen et al. | 455/450 |
| 6,807,426 B2 | * | 10/2004 | Pankaj | 455/453 |
| 7,010,017 B2 | * | 3/2006 | Lin | 375/147 |
| 7,272,120 B2 | * | 9/2007 | Rajkotia | 370/329 |
| 7,299,064 B1 | * | 11/2007 | Paranchych et al. | 455/522 |
| 7,590,095 B2 | * | 9/2009 | Chen et al. | 370/335 |
| 2002/0022468 A1 | * | 2/2002 | Yoon et al. | 455/403 |
| 2004/0156341 A1 | * | 8/2004 | Cheng et al. | 370/335 |
| 2004/0176090 A1 | * | 9/2004 | Mudigonda et al. | 455/434 |
| 2004/0185868 A1 | * | 9/2004 | Jain et al. | 455/453 |
| 2004/0203809 A1 | * | 10/2004 | Au et al. | 455/450 |
| 2005/0197080 A1 | * | 9/2005 | Ulupinar et al. | 455/135 |
| 2005/0201331 A1 | * | 9/2005 | Gaal et al. | 370/332 |
| 2005/0239466 A1 | * | 10/2005 | Calin et al. | 455/437 |

FOREIGN PATENT DOCUMENTS

| | | |
|---|---|---|
| EP | 1043908 | 10/2000 |
| WO | WO 02/07366 | 1/2002 |
| WO | WO 2004/066666 | 8/2004 |
| WO | WO 2005/060277 | 6/2005 |

* cited by examiner

*Primary Examiner*—Sharad Rampuria
(74) *Attorney, Agent, or Firm*—Coats & Bennett, P.L.L.C.

(57) ABSTRACT

A Forward Supplemental Channel (F-SCH) serving sector for a packet data call to a mobile terminal in a CDMA network is dynamically selected by monitoring radio channel conditions at potential F-SCH serving sectors. The sector loading at the potential F-SCH serving sectors is also monitored. A new F-SCH serving sector is then selected based on the sector loading and the channel condition measurements. Radio channel conditions may be monitored by PPSMM and/or CQI reports from the mobile terminal, monitoring the transmit power on the F-FCH of sectors in the mobile terminal's active set, and monitoring the transmit power on the F-SCH of the current serving sector. The new F-SCH serving sector may be determined by estimating sector loading of each potential sector at each possible data rate, and selecting the sector offering the highest data rate and lowest loading at that rate.

32 Claims, 3 Drawing Sheets

SECTOR SELECTION FOR F-SCH

BACKGROUND OF THE INVENTION

The present invention generally relates to wireless communication networks and in particular to a method of serving sector selection for packet data on a Forward Supplemental Channel (F-SCH).

An increasing trend in modern digital wireless communication networks, such as Code Division Multiple Access (CDMA) cellular networks, is the provision of data services, in addition to the traditional voice service. Data transmission may be circuit-switched, in which a logical channel is assigned to an individual mobile terminal for the duration of the data transfer, or packet-switched, in which data is packaged into logical addressable units ("packets"), which are transferred from point to point within the network until they reach their destination. Packet data may be transferred on a dedicated traffic channel to a single mobile terminal, or broadcast on a general channel, from which each mobile terminal may receive packets addressed to it.

The Forward Supplemental Channel (F-SCH) is a physical traffic channel that was introduced in the IS-2000 standard to allow the network to deliver high-speed data to mobile terminals, by allocating a large amount of radio resources, such as transmit power, Walsh space, and network resources to individual users. The resources include channel elements (CEs), BSC-BS backhaul bandwidth, and the like. In contrast to the Forward Fundamental Channel (F-FCH) operation, supporting F-SCH in soft handoff may not be efficient in term of maintaining system resource utilization and achieving high data throughput on various practical systems. The radio resources needed to support the F-SCH are proportional to the data rate on the F-SCH, and supporting soft handoff and/or a high data rate on the F-SCH can impose a significant toll on limited system resources. For example, a 2-way F-SCH soft handoff requires twice the physical resources (i.e., Walsh codes, CEs, and the maintenance of two data streams) as required by the F-SCH without soft handoff. Managing multiple data streams during soft handoff also adds complexity to the scheduling of data transmission. Moreover, complicated power control is needed to handle various active set change scenarios in order to maintain the desired quality on the F-SCH link.

Supporting F-SCH without soft handoff allows the system to maintain an efficient utilization of the limited system resources, since only one set of resources is allocated for the F-SCH at any time. It also simplifies the scheduling of data transmission as well as resource management design, and hence, reduces the overall system complexity and improves the stability. However, disabling soft handoff for F-SCH also presents technical challenges in maintaining the desired link quality for the F-SCH, especially when the mobile terminal is located in a soft handoff region or moves from one cell to another. Without soft handoff, as the mobile moves away from the F-SCH serving sector, the radio environment changes and the current serving sector cannot maintain a good quality F-SCH link to the mobile terminal, resulting in degraded data throughput for the mobile terminal. To compensate for the decreasing radio link quality, the F-SCH serving sector must either transmit with increasing power, which causes interference in the network, or the F-SCH data rate must be reduced, which reduces the throughput (or both). Eventually, either the mobile terminal or the network controllers will realize that there is very low throughput on the F-SCH link (such as by noting a high Frame Error Rate (FER)), and the F-SCH link is released. A new F-SCH link can then be brought up and a new serving sector can be selected. However, during the interim, the F-FCH must carry the high-speed data packets; thus, if the F-FCH is near its bandwidth, the throughput of packet data to the mobile terminal may suffer significantly.

SUMMARY OF THE INVENTION

The present invention relates to a method of dynamically selecting a Forward Supplemental Channel (F-SCH) serving sector for a packet data call to a mobile terminal in a CDMA wireless communication network. The F-SCH serving sector selection process is ongoing, so that the F-SCH channel may be handed off to a new F-SCH serving sector as required to maintain high data rates to the mobile terminal and low loading on the serving sector. Radio channel conditions are monitored on a plurality of potential F-SCH serving sectors to obtain one or more radio channel condition measurements. The loads on the plurality of potential F-SCH serving sectors are monitored to obtain sector load measurements. The radio channel condition measurements are filtered to obtain filtered radio channel condition measurements. A new F-SCH serving sector is then determined based on the sector load measurements and the filtered radio channel condition measurements.

Monitoring radio channel conditions may include monitoring a Periodic Pilot Strength Measurement Message (PPSMM) from the mobile terminal to obtain pilot signal strength measurements; monitoring Channel Quality Indicators (CQI) from the mobile terminal to obtain channel quality indicator measurements; monitoring the transmit power on the Forward Fundamental Channel (F-FCH) of a plurality of sectors in the mobile terminal's active set; and/or monitoring the transmit power on the F-SCH channel of the current serving sector.

A new F-SCH serving sector may be selected by, for each potential F-SCH serving sector, estimating radio channel conditions for the sector; predicting F-SCH power consumption for the sector based on the estimated radio channel conditions; predicting sector load and interference change if the sector is made the F-SCH serving sector, based on the predicted F-SCH power consumption and the sector load measurements; and selecting the best rate and sector combination from among the potential F-SCH serving sectors based on the predicted sector load and interference changes.

The best rate and sector combination from among the potential F-SCH serving sectors may be selected by predicting sector loading at each possible F-SCH data rate for each potential F-SCH serving sector. The sector with the highest available data rate and lowest sector loading, as compared to the sector with the highest pilot signal strength, may then be selected as the new F-SCH serving sector.

DETAILED DESCRIPTION OF THE INVENTION

Figure 1:
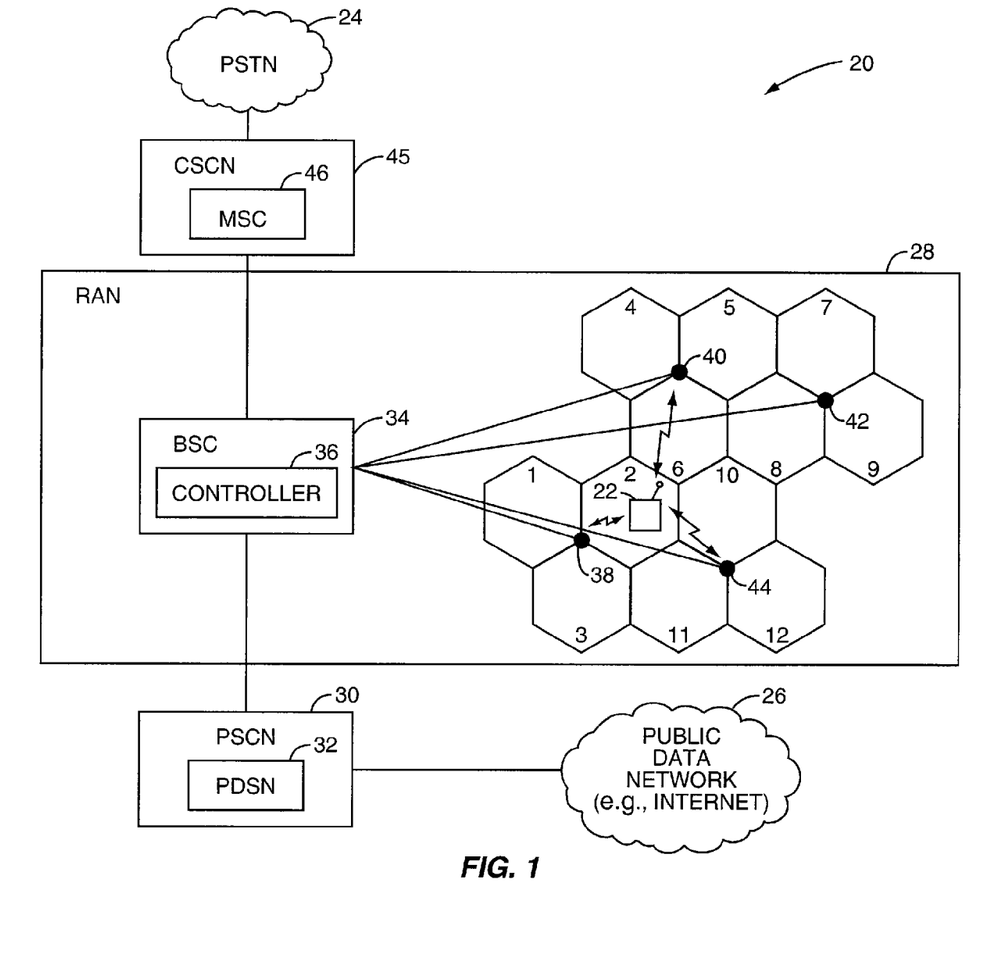
FIG. 1 is a diagram of a wireless communication network.

FIG. 1 illustrates an exemplary Code Division Multiple Access (CDMA) wireless communication network generally referred to by the numeral 20. In an exemplary embodiment, network 20 is based on cdma2000, 1xEV-DO/DV standards as promulgated by the Telecommunications Industry Association (TIA), although the present invention is not limited to such implementations. In general, the F-SCH serving sector selection method of the present invention may be advantageously applied to any CDMA-based $3^{rd}$ generation (3G) wireless communication system, such as for example Wideband CDMA (W-CDMA), Time Division Synchronous CDMA (TD-SCDMA), Universal Mobile Telecommunications System (UMTS) and the like.

Network 20 communicatively couples one or more mobile terminals (mobile terminal) 22 to the Public Switched Telephone Network (PSTN) 24 for voice and circuit-switched data calls, and to a Public Data Network (PDN) 26, such as the Internet, for packet-switched data transfers. In support of this functionality, network 20 comprises a Radio Access Network (RAN) 28, a Circuit Switched Core Network (CSCN) 45 and a Packet Switched Core Network (PSCN) 30. The 4 CSCN 5 includes a Mobile Switching Center 46. The PSCN 30 includes a Packet Data Serving Node (PDSN) 32. As the functionality of the CSCN 45 and PSCN 30 are known in the art, and are not germane to the present invention, neither is explicated further.

RAN 28 typically comprises one or more Base Station Controllers (BSC) 34, each including one or more controllers 36 or other processing systems. Generally, each BSC 34 is associated with one or more Base Stations (BS) 38, 40, 42, 44. The BSC 34 provides coordinated control of the various BSs 38, 40, 42, 44, and communicatively couples the mobile terminals 22 through the CSCN 45 to the PSTN 24 for voice and data calls. The BSC 34 additionally couples mobile terminals 22 through the PSCN 30 to one or more PDNs 26 for data transfers.

BSs 38, 40, 42, 44 may be referred to as Base Transceiver Systems (BTS) or Radio Base Stations (RBS). Each BS 38, 40, 42, 44 comprises one or more controllers or other processing systems, and transceiver resources supporting radio communication with mobile terminals 22, such as modulators/demodulators, baseband processors, radio frequency (RF) power amplifiers, antennas, and the like (internal BS resources not shown). In operation, a BS 38, 40, 42, 44 transmits control and traffic data to one or more mobile terminals 22, and receive control and traffic data from them. Each BS 38, 40, 42, 44 provides wireless communications services to a limited geographic region, commonly known as a cell. As well known in the art, each cell may be sub-divided into a plurality of independently addressable sectors, each assigned a unique Pseudo-random Noise (PN) code offset.

FIG. 1 depicts four representative cells, each divided into three sectors. BS 38 provides communications services to mobile terminals 22 within its cell, which comprises sectors 1, 2 and 3. Similarly, BS 40 serves a cell comprising sectors 4, 5 and 6; BS 42 serves a cell comprising sectors 7, 8 and 9; and BS 44 serves a cell comprising sectors 10, 11 and 12. While the sectors 1-12 are depicted in FIG. 1 as regular, interlocking hexagonal shapes, in practice both cell and sector shapes are irregular and even somewhat dynamic, depending on terrain, buildings or other structures, weather, and the like.

FIG. 1 depicts a mobile terminal 22 in sector 2. As used herein, the term "mobile terminal" may include a cellular radiotelephone with or without a multi-line display; a Personal Communication System (PCS) terminal that may combine a cellular radiotelephone with data processing, facsimile, and data communication capabilities; a Personal Digital Assistant (PDA) that can include a radiotelephone, pager, Internet/intranet access, web browser, organizer, calendar, and/or a global positioning system (GPS) receiver; a conventional laptop and/or palmtop receiver; or other appliance or mobile station that includes a radiotelephone transceiver.

As indicated, mobile terminal 22 receives at least wireless pilot signals from BSs 38, 40, and 44. From these signals, the mobile terminal may measure the pilot signal strengths broadcast by the BSs 38, 40, and 44 and report this data back to the serving BS 38, such as in a Periodic Pilot Strength Mobile Message (PPSMM). As known in the art, BSs 38, 40, and 44 may be included in the "active set" of the mobile terminal 22. The active set comprises neighboring BSs (or sectors thereof) that may be candidates for Mobile Assisted Hand Off (MAHO).

BS 38 may also broadcast a high-speed Forward Packet Data Channel (F-PDCH). The F-PDCH differs from traditional traffic channels in several ways—primarily in that it is not dedicated to any single mobile terminal, and it does not implement power control. Rather, the F-PDCH broadcasts packet data for a plurality of mobile terminals on the same channel, and it broadcasts the data at the full residual power level available at the BS 38, after the traffic and control channels determine their respective power-controlled broadcast power levels. The F-PDCH utilizes rate control to match the packet data rate to the ability of each mobile terminal to receive the data. To indicate to the F-PDCH serving sector the greatest rate at which a given mobile can receive packet data, the mobile terminals transmit Channel Quality Indicator (CQI) reports to the F-PDCH serving sector.

The CQI is a quantized indicator of the channel quality experienced by the mobile terminal 22, and may for example comprise a carrier/interference ratio (C/I) quantized into a predetermined range of dB values. The CQI is generally broadcast at a high rate, e.g., 800 Hz, or once every 1.25 msec. The CQI thus provides a high rate channel feedback mechanism to report the relative C/I at each mobile terminal 22. The CQI transmissions additionally indicate the sector from the mobile terminal's active set with the highest signal strength, by "covering" the CQI data bits with a Walsh code corresponding to the best sector.

The BSC controller 36 may thus monitor the radio channel between the F-SCH serving sector of BS 38 and the mobile terminal 22, such as via the PPSMMs transmitted by the mobile terminal 22, or, through the BS 38, the CQIs. The BSC controller 36 may additionally assess the radio channel by monitoring the F-FCH and F-SCH power measurements, for the F-SCH serving sector and neighboring sectors. To reduce the impact of short-term radio conditions on these channel measurements, the various metrics may be filtered, such as by an Infinite Impulse Response (IIR) filter, by averaging, or the like. Filtering of the channel measurements is preferred, to remove transient phenomena such as temporal variation in radio channel conditions due to deep fading, shadowing and bursty interference increases from neighboring sectors or cells.

In one embodiment, the pilot strength measurements from the PPSMM may be filtered by the following IIR equation:

$$Y_i[n]:=(1-a)Y_i[n-1]+aP_i \qquad (1)$$

where:
n is an index for successive PPSMM reports,
i is an index through the sectors reported in each PPSMM report,
a is an attenuation factor that determines the time constant of the filter, and
P is the measured pilot strength for sector i reported in the latest PPSMM.

The filter output $Y_i$ is the average pilot strength of sector i.

Similarly, in one embodiment, the channel quality measurements from the CQI may be filtered by the following IIR equation:

$$X[n]:=(1-b)X[n-1]+b\,Var(CQI[n],\ldots CQI[n-m+1]) \quad (2)$$

where:
n is an index for successive CQI reports,
Var(CQI[n], . . . CQI[n−m+1]) is the estimated variance of m consecutive samples, and
b is an attenuation factor that determines the time constant of the filter.

The filter output X is the average CQI variance of the F-PDCH serving sector, from which the system can determine the mobility characteristics of the radio channel.

Alternatively, the CQI may be filtered by the following equation:

$$Z[n]:=(1-c)Z[n-1]+cCQI[n] \quad (3)$$

where:
n is an index for successive CQI reports, and
c is an attenuation factor that determines the time constant of the filter.

The output Z indicates the average channel (or pilot) strength of the F-PDCH serving sector, which is normally the strongest seen by the mobile.

In one embodiment, for the F-FCH, a low-pass filter is preferably used to obtain the average F-FCH transmit power over a predetermined duration. This data may be used to compute the proper F-SCH data rate on the candidate serving sector.

In addition to the channel measurements described above, the BSC controller 36 may also analyze the user packet data characteristics (such as packet arrival rate, average packet size, and the like); resource utilization on the current F-SCH link; as well as sector loading for the F-SCH serving sector on neighboring sectors. According to the present invention, this information is combined with the radio channel condition measurements to determine (as accurately as possible), the F-SCH serving sector data rate for each of a plurality of candidate F-SCH serving sectors, and the projected loading of those sectors at that rate. The candidate F-SCH serving sector able to provide the highest data rate with the lowest loading conditions is then selected as the new F-SCH serving sector, and the mobile terminal 22 may be handed off to the new F-SCH serving sector as necessary.

Figure 2:
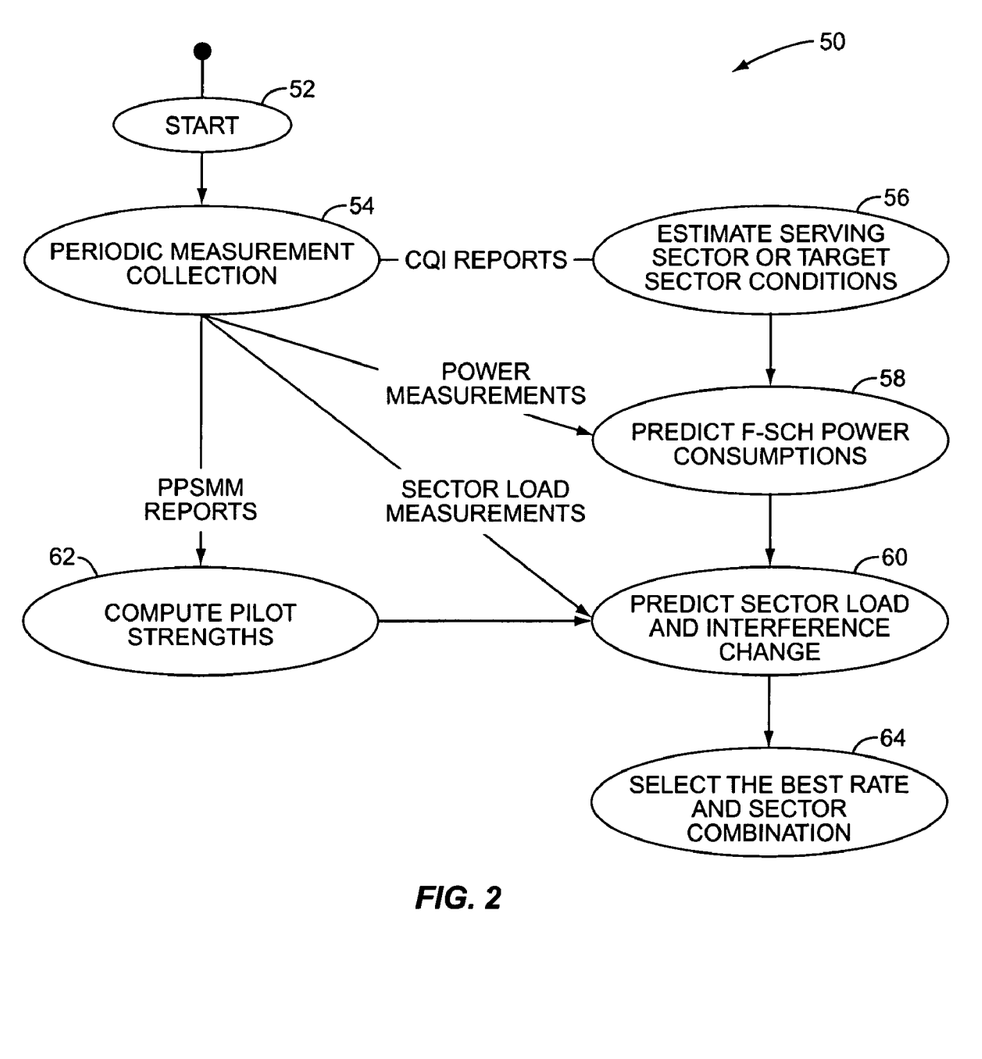
FIG. 2 is a flow diagram of a method of F-SCH serving sector selection.

FIG. 2 depicts a flow diagram demonstrating how, in one embodiment, the following channel measurements and sector loading information are utilized to determine the best F-SCH serving sector. The data monitored includes:
  Periodic Pilot Strength Measurement Message (PPSMM) reported by the mobile terminal 22.
  CQI report from the mobile terminal 22 (if the mobile terminal 22 supports the Packet Data Channel (PDCH).
  Transmit power on the F-FCH channels in the active set of the mobile terminal 22.
  Transmit power on the F-SCH channel (from the serving sector).
  The load information of all of the sectors or cells in the active set of the mobile terminal 22.

Beginning at the START block 52, the BSC controller 36 collects periodic channel measurements, as shown at block 54. These include the CQI reports from the mobile terminal 22, from which the BSC controller 36 estimates the current F-SCH serving sector or a candidate F-SCH serving sector channel conditions, as shown at block 56. The BSC controller 36 also monitors power measurements to predict F-SCH power consumption at candidate F-SCH serving sectors, as indicated at block 58. The BSC controller 36 monitors PPSMM reports from the mobile terminal 22, to obtain pilot signal strengths, as indicated at block 62. This information is combined with the power consumption estimates of block 58, and measurements of the load at candidate F-SCH serving sectors, to predict the sector load and interference changes at each candidate F-SCH serving sector, if that sector were made the F-SCH serving sector, as indicated at block 60. From these sector load and interference change estimates, the best rate and sector combination is selected from among the candidate F-SCH serving sectors, as indicated at block 64.

Figure 3:
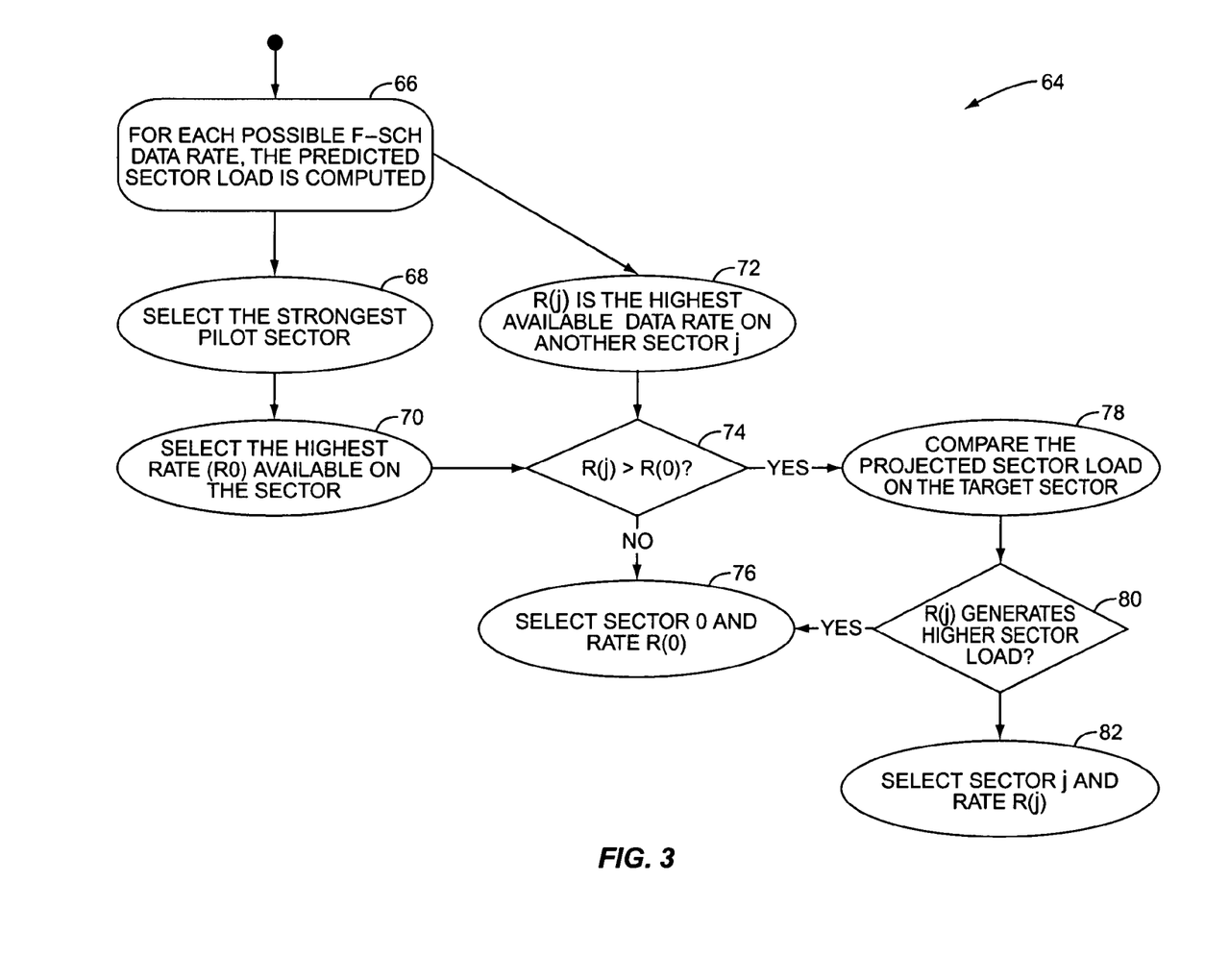
FIG. 3 is a flow diagram of one of the steps of the method of FIG. 2.

An example of the selection process of block 64 of FIG. 2 is depicted in greater detail in the flow diagram of FIG. 3. For each candidate F-SCH serving sector, the sector load is predicted for each possible F-SCH data rate, as indicated as block 66. The candidate F-SCH serving sector having the strongest pilot signal as received by the mobile terminal 22 (referred to as sector 0) is selected, as indicated at block 68, and the highest data rate R(0) available on that sector is selected, as indicated at block 70. Similarly, the highest available data rate R(j) is determined for each remaining candidate sector j, as indicated at block 72. Each of these data rates R(j) (corresponding to each sector j in the active set) is compared to the rate R(0) (the highest rate at the sector 0 having the strongest pilot signal) as indicated at block 74. If each R(j) is less than or equal to R(0)—that is, if none of the highest available data rates at the other sectors j exceeds the highest available data rate at sector 0 having the greatest pilot signal strength—then sector 0 is selected as the new F-SCH serving sector, as indicated at block 76.

If any R(j) is greater than R(0)—that is, if the highest available data rate at another sector j exceeds the highest available data rate at the sector 0 having the greatest pilot signal strength—then the projected load on that sector j is compared to the projected load on sector 0, as indicated at block 78. If, as indicated at block 80, the highest available data rate R(j) generates a higher projected total load on sector j than does R(0) on sector 0, then sector 0 is selected as the new F-SCH serving sector, as indicated at block 76. If, on the other hand, the highest available data rate R(j) at another sector j does not generate a higher projected total load than does R(0) on sector 0, then that sector j is selected as the new F-SCH serving sector, as indicated at block 82. The same comparisons against sector 0 are performed for all candidate F-SCH serving sectors.

In this manner, the present invention selects the F-SCH serving sector providing both the highest projected available data rate and the lowest projected sector loading, based on channel condition measurements and loading measurements for all candidate F-SCH serving sectors. This provides the most efficient F-SCH mobility management, resulting in more reliable F-SCH connections. In addition, by operation of the present invention, the F-SCH link may be served by the "best" serving sector (e.g., high data rate and low loading), resulting in more efficient usage of system resources and less interference in the network. Finally, since the F-SCH serving sector can be changed without significantly affecting the data connection, degradation in data throughput can be avoided, resulting in a higher Quality of Service for the packet data call.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of dynamically selecting a Forward Supplemental Channel (F-SCH) serving sector for a packet data call to a mobile terminal in a CDMA wireless communication network, comprising:
   monitoring radio channel conditions for a plurality of potential F-SCH serving sectors to obtain one or more radio channel condition measurements;
   applying infinite impulse response (IIR) filtering to said radio channel condition measurements to obtain filtered radio channel condition measurements;
   monitoring the sector loading for said plurality of potential F-SCH serving sectors to obtain sector load measurements; and
   selectively changing from a current F-SCH serving sector to a new F-SCH serving sector based on said filtered radio channel condition measurements and said sector load measurements.

2. The method of claim 1 wherein said plurality of potential F-SCH serving sectors comprises the serving sectors in said mobile terminal's active list.

3. The method of claim 1 wherein monitoring the radio channel conditions on a plurality of potential F-SCH serving sectors to obtain one or more radio channel condition measurements comprises monitoring a Periodic Pilot Strength Measurement Message (PPSMM) from said mobile terminal to obtain pilot signal strength measurements.

4. The method of claim 1 wherein applying IIR filtering to said radio channel condition measurements to obtain filtered radio channel condition measurements comprises applying a low-pass IIR filter to said pilot signal strength measurements to remove short-term channel variations.

5. The method of claim 4 wherein said filter is $$Y_i[n] := (1-a)Y_i[n-1] + aP_i$$

where:
   n is an index for successive PPSMM reports,
   i is an index through the sectors reported in each PPSMM report,
   a is an attenuation factor that determines the time constant of the filter, and
   P is the measured pilot strength for sector i reported in the latest PPSMM.

6. The method of claim 1 wherein monitoring the radio channel conditions on a plurality of potential F-SCH serving sectors to obtain one or more radio channel condition measurements comprises monitoring a Channel Quality Indicator (CQI) from said mobile terminal to obtain channel quality indicator measurements.

7. The method of claim 1 wherein applying IIR filtering to said radio channel condition measurements to obtain filtered radio channel condition measurements comprises applying a low-pass IIR filter to said channel quality indicator measurement to remove short-term channel variations.

8. The method of claim 7 wherein said filter is $$X[n] := (1-b)X[n-1] + bVar(CQI[n], \ldots CQI[n-m+1])$$

where:
   n is an index for successive CQI reports,
   $Var(CQI[n], \ldots CQI[n-m+1])$ is the estimated variance of m consecutive samples, and
   b is an attenuation factor that determines the time constant of the filter.

9. The method of claim 8 wherein said filter is $$Z[n] := (1-c)Z[n-1] + cCQI[n]$$

where:
   n is an index for successive CQI reports, and
   c is an attenuation factor that determines the time constant of the filter.

10. The method of claim 1 wherein monitoring the radio channel conditions at a plurality of potential F-SCH serving sectors to obtain one or more radio channel condition measurements comprises monitoring the transmit power on the Forward Fundamental Channel (F-FCH) of a plurality of sectors in said mobile terminal's active set.

11. The method of claim 1 wherein applying IIR filtering to said radio channel condition measurements to obtain filtered radio channel condition measurements comprises applying a low-pass IIR filter to said F-FCH transmit power measurements to obtain the average F-FCH transmit power.

12. The method of claim 1 wherein monitoring the radio channel conditions on a plurality of potential F-SCH serving sectors to obtain one or more radio channel condition measurements comprises monitoring the transmit power on the F-SCH channel of the current serving sector.

13. The method of claim 1 wherein applying IIR filtering to said radio channel condition measurements to obtain filtered radio channel condition measurements comprises averaging said transmit power on the F-SCH channel of the current serving sector over a predetermined duration to reduce the impact of short-term channel variation.

14. The method of claim 1 wherein determining a new F-SCH serving sector based on said sector load measurements and said filtered radio channel condition measurements comprises, for each said potential F-SCH serving sector, estimating the maximum packet data rate on said potential F-SCH serving sector based on said sector load measurements and said filtered radio channel condition measurements, and selecting the sector with the highest said estimated packet data rate and lowest projected load at that data rate as the new F-SCH serving sector.

15. The method of claim 1 wherein determining a new F-SCH serving sector based on said sector load measurements and said filtered radio channel condition measurements comprises:
   for each said potential F-SCH serving sector:
      estimating radio channel conditions for said sector;
      predicting F-SCH power consumption for said sector based on said estimated radio channel conditions;
      predicting sector load and interference change if said sector is made the F-SCH serving sector, based on said predicted F-SCH power consumption and said sector load measurements; and
   selecting said new F-SCH serving sector based on said predicted sector load and interference changes.

16. The method of claim 15 wherein estimating radio channel conditions for said sector comprises estimating radio channel conditions for said sector based on CQI reports.

17. The method of claim 15 wherein predicting F-SCH power consumption for said sector is additionally based on power measurements.

18. The method of claim 15 wherein predicting sector load and interference change if said sector is made the F-SCH serving sector is additionally based on sector load measurements.

19. The method of claim 15 wherein predicting sector load and interference change if said sector is made the F-SCH serving sector is additionally based on pilot strengths.

20. The method of claim 19 wherein said pilot strengths are based on PPSMM reports.

21. The method of claim 15 wherein selecting said new F-SCH serving sector based on said predicted sector load and interference changes comprises:

for each possible F-SCH data rate, predicting the maximum data rate R(0) on the sector 0 having the strongest pilot signal, and, for each other potential F-SCH serving sector j, predicting the maximum data rate R(j) on each sector j, and comparing R(j) with R(0);

for each said other potential F-SCH serving sector j, if R(j) is greater than R(0), comparing the predicted load on sector j with the projected load on sector 0, and if the projected total load on sector j using R(j) is less than the total projected load on sector 0 using R(0), selecting sector j as said new F-SCH serving sector; and for each said other potential F-SCH serving sector j, if R(0) is greater than or equal to R(j) or if the projected total load on sector j using R(j) is greater than or equal to the total projected load on sector 0 using R(0), selecting sector 0 as said new F-SCH serving sector.

22. A CDMA wireless communication network providing a packet data call to at least one mobile terminal on a Forward Supplemental Channel (F-SCH), comprising:

a Base Station Controller (BSC) controlling at least one Base Station (BS) defining a cell having a plurality of sectors; and a processor in said BSC operative to dynamically select a F-SCH serving sector for said packet data call, said processor performing the steps of:

monitoring the radio channel conditions on a plurality of potential F-SCH serving sectors to obtain one or more radio channel condition measurements;

applying infinite impulse response (IIR) filtering to said radio channel condition measurements to obtain filtered radio channel condition measurements;

monitoring the load on said plurality of potential F-SCH serving sectors to obtain sector load measurements; and determining a new F-SCH serving sector based on said sector load measurements and said filtered radio channel condition measurements.

23. The network of claim 22 wherein monitoring the radio channel conditions on a plurality of potential F-SCH serving sectors to obtain one or more radio channel condition measurements comprises monitoring a Channel Quality Indicator (CQI) from said mobile terminal to obtain channel quality indicator measurements.

24. The network of claim 23 wherein monitoring the radio channel conditions on a plurality of potential F-SCH serving sectors to obtain one or more radio channel condition measurements further comprises a process selected from the group consisting of:

monitoring a Periodic Pilot Strength Measurement Message (PPSMM) from said mobile terminal to obtain pilot signal strength measurements, monitoring the transmit power on the Forward Fundamental Channel (F-FCH) of a plurality of sectors in said mobile terminal's active set, and monitoring the transmit power on the F-SCH channel of the current serving sector.

25. The method of claim 22 wherein determining a new F-SCH serving sector based on said sector load measurements and said filtered radio channel condition measurements comprises:

for each said potential F-SCH serving sector:
estimating radio channel conditions for said sector;
predicting sector load and interference change if said sector is made the F-SCH serving sector, based on said estimated channel conditions and said sector load measurements; and selecting said new F-SCH serving sector based on said predicted sector load and interference changes.

26. The method of claim 25 wherein selecting said new F-SCH serving sector based on said predicted sector load and interference changes comprises predicting the highest allowable data rate and projected loading at that rate for each said potential F-SCH serving sector, and selecting as the new F-SCH serving sector the sector having the highest data rate and lowest loading.

27. A method of dynamically selecting a Forward Supplemental Channel (F-SCH) serving sector for a packet data call to a mobile terminal in a CDMA wireless communication network, comprising:

monitoring the radio channel conditions on a plurality of potential F-SCH serving sectors to obtain one or more radio channel condition measurements;

applying infinite impulse response (IIR) filtering to said radio channel condition measurements to obtain filtered radio channel condition measurements;

monitoring the load on said plurality of potential F-SCH serving sectors to obtain sector load measurements;

for each said potential F-SCH serving sector, predicting the sector load for each possible F-SCH data rate, based on said filtered radio channel condition measurements and said sector load measurements; and selecting a new F-SCH serving sector based on said predicted sector loads and said data rates.

28. The method of claim 27 wherein selecting a new F-SCH serving sector based on said predicted sector loads and said data rates comprises:

for each possible F-SCH data rate, predicting the maximum data rate R(0) on the sector 0 having the strongest pilot signal, and, for each other potential F-SCH serving sector j, predicting the maximum data rate R(j) on each sector j, and comparing R(j) with R(0);

for each said other potential F-SCH serving sector j, if R(j) is greater than R(0), comparing the predicted load on sector j with the projected load on sector 0, and if the projected total load on sector j using R(j) is less than the total projected load on sector 0 using R(0), selecting sector j as said new F-SCH serving sector; and for each said other potential F-SCH serving sector j, if R(0) is greater than or equal to R(j) or if the projected total load on sector j using R(j) is greater than or equal to the total projected load on sector 0 using R(0), selecting sector 0 as said new F-SCH serving sector.

29. A method of dynamically selecting a serving sector for serving a mobile station on a Forward Supplemental Channel (F-SCH) from a plurality of sectors comprising:

receiving radio condition information for each sector relative to the mobile station;

applying infinite impulse response (IIR) filtering to said radio condition information to obtain filtered radio condition information;

receiving sector loading information for each sector;

identifying a best sector for serving the mobile station on the F-SCH based on the sector loading and filtered radio condition information; and selecting a new serving sector if the best sector is not the current serving sector.

30. The method of claim 29 wherein said radio condition information is selected from the group consisting of PPSMM reports, CQI reports, F-FCH power measurements and F-SCH power measurements.

31. The method of claim 29 wherein identifying a best sector for serving the mobile station on the F-SCH based on the sector loading and filtered radio condition information comprises estimating the highest possible data rate on each said sector and the sector loading at that rate, and identifying the sector with the highest data rate and lowest sector loading as the best sector.

32. The method of claim 31 wherein the sector with the highest pilot signals strength is initially selected as the best sector, and the estimated data rate and sector loading of each other sector is compared against the estimated data rate and sector loading of the sector with the highest pilot signals strength.

* * * * *

UNITED STATES PATENT AND TRADEMARK OFFICE
CERTIFICATE OF CORRECTION

| | | |
|---|---|---|
| PATENT NO. | : 7,680,093 B2 | Page 1 of 1 |
| APPLICATION NO. | : 10/928410 | |
| DATED | : March 16, 2010 | |
| INVENTOR(S) | : Duan et al. | |

It is certified that error appears in the above-identified patent and that said Letters Patent is hereby corrected as shown below:

In Fig. 3, Sheet 3 of 3, for Tag "70", in Line 2, delete "(R0)" and insert -- R(0) --, therefor.

In Column 3, Line 16, delete "4 CSCN 5" and insert -- CSCN 45 --, therefor.

Signed and Sealed this

Thirteenth Day of July, 2010

David J. Kappos
*Director of the United States Patent and Trademark Office*